US006932550B1

(12) United States Patent
Hope

(10) Patent No.: US 6,932,550 B1
(45) Date of Patent: Aug. 23, 2005

(54) MOTORCYCLE ANCHORING DEVICE

(76) Inventor: Robert Hope, 110 Briar Way, Neshanic Station, NJ (US) 08853

( * ) Notice: Subject to any disclaimer, the term of this patent is extended or adjusted under 35 U.S.C. 154(b) by 16 days.

(21) Appl. No.: 10/810,222

(22) Filed: Mar. 26, 2004

(51) Int. Cl.⁷ .................................................. B60P 7/08
(52) U.S. Cl. ............................... 410/3; 410/23; 410/97
(58) Field of Search ............................ 410/2, 3, 7, 11, 410/23, 97, 100; 224/534, 568, 924; 248/499; 24/265 CD, 712, 712.1, 712.2, 713, 713.1

(56) References Cited

U.S. PATENT DOCUMENTS

| | | | |
|---|---|---|---|
| 2,789,832 A | | 4/1957 | Zumwalt |
| 3,822,898 A | | 7/1974 | Brownlie |
| 5,326,202 A | * | 7/1994 | Stubbs ........................... 410/3 |
| 5,529,448 A | * | 6/1996 | Kosma ......................... 410/97 |
| 5,697,629 A | | 12/1997 | Guild |
| 5,701,771 A | * | 12/1997 | Bailey |
| 5,915,899 A | * | 6/1999 | Dennis ......................... 410/36 |
| 6,065,914 A | * | 5/2000 | Fotou ............................. 410/3 |
| 6,171,034 B1 | * | 1/2001 | Burgoon et al. ............... 410/3 |
| 6,524,041 B1 | * | 2/2003 | Voiculescu ................. 410/100 |
| 6,626,620 B1 | * | 9/2003 | Veal ............................. 410/36 |
| 6,655,885 B2 | * | 12/2003 | Trauthwein .................. 410/97 |
| 6,705,811 B1 | * | 3/2004 | Selby ............................. 410/3 |
| 6,715,972 B2 | * | 4/2004 | Jackson, Sr. ................. 410/97 |
| 6,761,519 B2 | * | 7/2004 | Alderman ....................... 410/3 |
| 6,805,522 B2 | * | 10/2004 | Condon .......................... 410/3 |

* cited by examiner

Primary Examiner—Stephen Gordon
(74) Attorney, Agent, or Firm—Goldstein Law Offices, P.C.

(57) ABSTRACT

A pair of handle covers that are adapted for positioning over handles of a motorcycle. The pair of handle covers each have an open inner end and a closed outer end. The open inner end is closable via a drawstring. The drawstring has opposed free ends disposed outwardly of the handle cover. The free ends of the drawstring each have a grommet secured thereto. The pair of handle covers are positioned over the handles of the motorcycle as the motorcycle is positioned atop a transportation trailer. A pair of straps each has free ends having hooked fasteners. The grommets each receive the hooked fasteners from one of the free ends of the straps therein, and the hooked fasteners are then extended downwardly diagonal with the hooked fasteners of the other free end thereof coupling with the transportation trailer.

2 Claims, 2 Drawing Sheets

MOTORCYCLE ANCHORING DEVICE

BACKGROUND OF THE INVENTION

The invention relates to a motorcycle anchoring device for keeping a motorcycle stable and upright while towing.

Motorcycles have an ability, unique among land-based motor vehicles, to liberate the mind and spirit, whether a rider is carving up the countryside to see the world from a different angle or just riding laid back while boring a hole into the horizon. As many biking enthusiasts would attest, the world on two wheels is refreshingly different. Fostering feelings of freedom and thrills, bikers find that there is more to these machines than the engine, wheels and the framework that holds them together. Even so, motorcyclists take great pains to preserve their beloved bikes. From building extraneous structures expressly for the storage of their machines to covering them with durable, heavy duty tarps when the bikes are outside, bikers seek a myriad of ways to protect their expensive equipment from the elements and accidental damages. However, towing motorcycles can present a challenge to this endeavor. Whether secured in a customized trailer or transported in the back of a truck, motorcycles that are towed can become susceptible to tipping over or, even worse, falling out of the storage bay as the towing vehicle moves along the highway. As a result, costly or even irreparable damage is sure to follow. What is needed is a device that will allow a motorcycle to be transported while reducing the risk of the motorcycle from becoming damaged during transport.

The present invention attempts to solve the abovementioned problem by providing a motorcycle anchoring device for keeping a motorcycle stable and upright while towing.

U.S. Pat. No. 2,789,832 to Zumwalt discloses a combination motorcycle tow bar and wheel lift with means to hold the cycle in an upright position. U.S. Pat. No. 3,822,898 to Brownlie discloses a motorcycle towing apparatus having a pair of channel like members for receiving the wheels. U.S. Pat. No. 5,697,629 to Guild discloses a motorcycle towing device.

While these units may be suitable for the particular purpose employed, or for general use, they would not be as áásuitable for the purposes of the present invention as disclosed hereafter.

SUMMARY OF THE INVENTION

It is an object of the invention to produce a motorcycle anchoring device for keeping a motorcycle stable and upright while towing.

The present invention is essentially comprised of a pair of handle covers that are adapted for positioning over handles of a motorcycle. The pair of handle covers each have an open inner end and a closed outer end. The open inner end is closable via a drawstring. The drawstring has opposed free ends disposed outwardly of the handle cover. The free ends of the drawstring each have a grommet secured thereto. The pair of handle covers are positioned over the handles of the motorcycle as the motorcycle is positioned atop a transportation trailer. A pair of straps each has free ends having hooked fasteners. The grommets each receive the hooked fasteners from one of the free ends of the straps therein, and the hooked fasteners are then extended downwardly diagonal with the hooked fasteners of the other free end thereof coupling with the transportation trailer.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
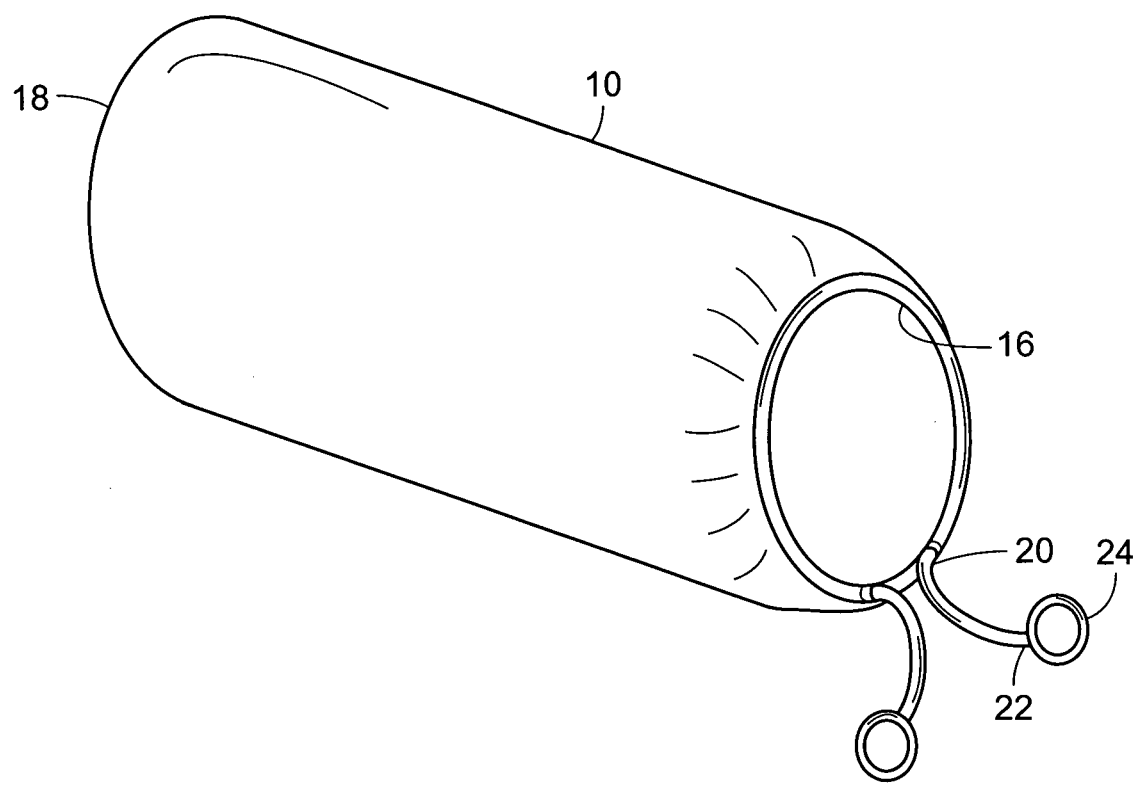
FIG. 1 is a perspective view of one of the handle covers of the present invention.

FIG. 1 illustrates a motorcycle anchoring device for keeping a motorcycle stable and upright while towing. In its broadest context, the present invention is essentially comprised of a pair of handle covers.

Figure 2:
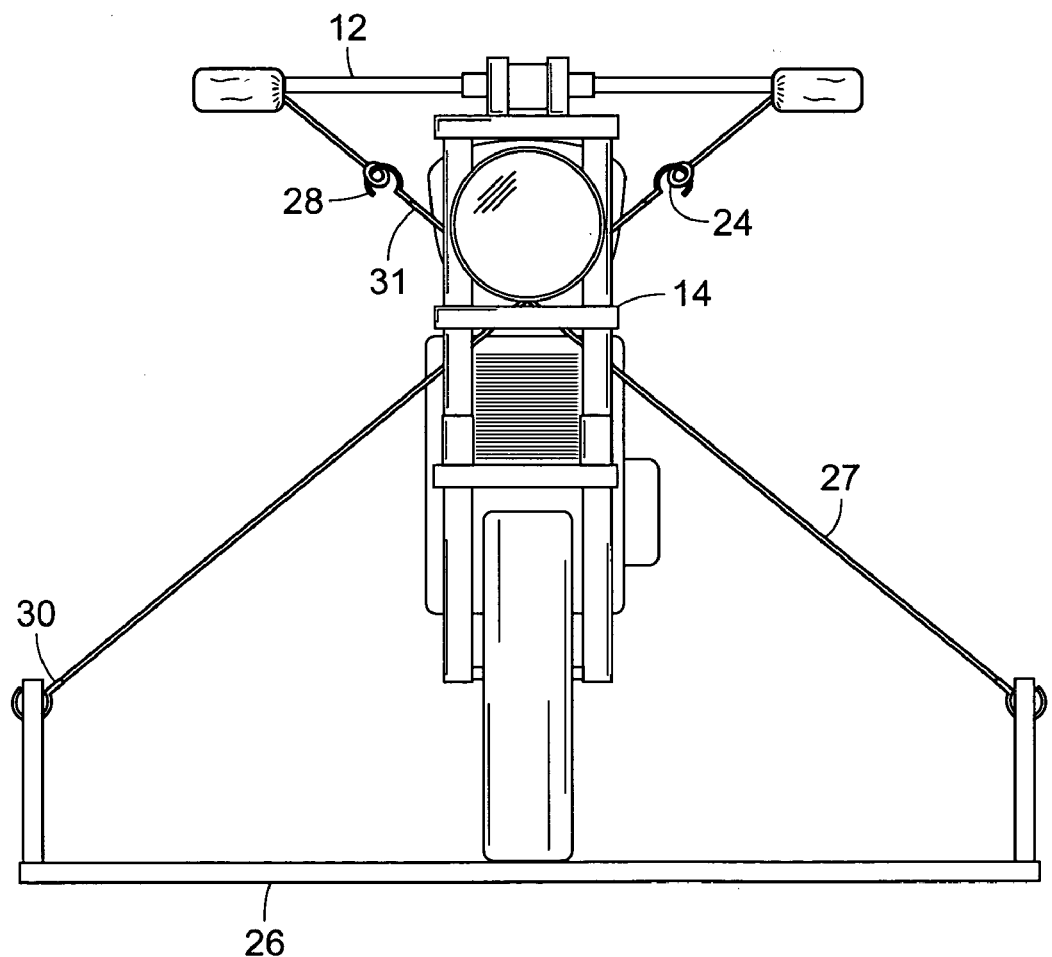
FIG. 2 is a front elevation view of the present invention illustrated in use.

FIG. 1 illustrates the pair of handle covers 10, which are adapted for positioning over handles 12 of a motorcycle 14 shown in FIG. 2. The pair of handle covers 10 each have an open inner end 16 and a closed outer end 18. The open inner end 16 is closable via a drawstring 20. The drawstring 20 has opposed free ends 22 disposed outwardly from the handle cover 10. The free ends 22 each have a grommet 24 secured thereto. In FIG. 2, the pair of handle covers 10 are positioned over the handles 12 of the motorcycle 14 as the motorcycle 14 is positioned atop a transportation trailer 26. A pair of straps 27 has free ends 30 and 31. The free ends 30 and 31 of the straps include hooked fasteners 28. The grommets 24 each receive the hooked fasteners 28 from the free end 31 of the straps therein. The hooked fasteners 28 are then extended downwardly diagonal with the hooked fasteners 28 of the free ends 30 thereof coupling with the transportation trailer 26.

The use of the present invention is straightforward. First, position the motorcycle 14 on the trailer 26. Next, slide one of the covers 10 over the left handlebar and then repeat the process for the right handlebar. The drawstrings 20 are then pulled tight to achieve closure. The hooked fasteners 28 are then put in place on the grommets 24 and then pulled down for securement to the trailer 26.

In conclusion, herein is presented a motorcycle anchoring device for keeping a motorcycle stable and upright while towing. The invention is illustrated by example in the drawing figures, and throughout the written description. It should be understood that numerous variations are possible, while adhering to the inventive concept. Such variations are contemplated as being a part of the present invention.

What is claimed is:

1. A motorcycle anchoring device for keeping a motorcycle stable and upright while towing comprising, in combination:

a pair of handle covers adapted for positioning over handles of the motorcycle, the pair of handle covers each having an open inner end and a closed outer end, the open inner end being closable via a drawstring, the drawstring having opposing free ends disposed outwardly from the handle cover, the free ends each having a grommet secured thereto, the pair of handle covers being positioned over the handles of the motorcycle as the motorcycle is positioned atop a transportation trailer; and a pair of straps having free ends having hooked fasteners, the grommets each receive respective ones of the hooked fasteners from one of the free ends of the straps therein, and ones of the hooked fasteners are then extended downwardly diagonal with the hooked fasteners of the respective other strap free ends coupling with the transportation trailer.

2. A motorcycle anchoring device and method for keeping a motorcycle stable and upright while towing comprising, in combination:

providing the motorcycle;

positioning the motorcycle atop a transportation trailer;

providing pair of handle covers adapted for positioning over handles of the motorcycle, the pair of handle covers each having an open inner end and a closed outer end, the open inner end being closable via a drawstring, the drawstring having opposing free ends disposed outwardly of the handle cover, the free ends each having a grommet secured thereto, the pair of handle covers being positioned over the handles of the motorcycle as the motorcycle is positioned atop the transportation trailer, a pair of straps having free ends having hooked fasteners, the grommets each receive respective ones of the hooked fasteners from one of the free ends of the straps therein, and ones of the hooked fasteners are then extended downwardly diagonal with the hooked fasteners of the respective other strap free ends coupling with the transportation trailer.

\* \* \* \* \*